(12) United States Patent
Koona et al.

(10) Patent No.: US 12,131,048 B2
(45) Date of Patent: Oct. 29, 2024

(54) ROLLBACK OF COMMENT MIGRATION TO CLOUD STORAGE

(71) Applicant: SAP SE, Walldorf (DE)

(72) Inventors: Siddiq Ahmed Koona, Bangalore (IN); Bharani Lingamaneni, Vijayawada (IN); Sahana Durgam Udaya, Bangalore (IN)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 17/850,337

(22) Filed: Jun. 27, 2022

(65) Prior Publication Data

US 2023/0418502 A1    Dec. 28, 2023

(51) Int. Cl.
| | | |
|---|---|---|
| *G06F 12/00* | (2006.01) | |
| *G06F 3/06* | (2006.01) | |
| *G06F 13/00* | (2006.01) | |
| *G06F 21/60* | (2013.01) | |
| *H04L 9/40* | (2022.01) | |

(52) U.S. Cl.
CPC .......... *G06F 3/0647* (2013.01); *G06F 3/0611* (2013.01); *G06F 3/067* (2013.01); *G06F 21/602* (2013.01); *H04L 63/02* (2013.01)

(58) Field of Classification Search
CPC ...... G06F 3/0647; G06F 3/0611; G06F 3/067; G06F 21/602; H04L 63/02
USPC ....................................................... 711/154
See application file for complete search history.

(56) References Cited

U.S. PATENT DOCUMENTS

| | | | | |
|---|---|---|---|---|
| 5,867,665 A | * | 2/1999 | Butman | H04L 63/083 709/239 |
| 5,867,667 A | * | 2/1999 | Butman | H04L 63/04 709/227 |
| 5,870,562 A | * | 2/1999 | Butman | H04L 61/35 707/E17.116 |

(Continued)

OTHER PUBLICATIONS

Anonymous "Collaboration for Stories", SAP Analytics Cloud, Q2 2022, dated Jun. 16, 2022, 4 pages.

(Continued)

*Primary Examiner* — Sheng Jen Tsai
(74) *Attorney, Agent, or Firm* — Fountainhead Law Group, PC

(57) ABSTRACT

Confidentiality and privacy of user comments stored on the cloud, are protected by encryption. A crypto server, and a browser including a migration engine, are located across a firewall from the cloud storage. In response to a migration instruction (e.g., received from an administrator), the migration engine utilizes batch processing to efficiently accomplish mass •onboarding, •offboarding, or •key rotation for comments stored on the cloud. To allow for graceful rollback, prior to initiating a migration operation the migration engine checks a migration status and a batch timestamp stored on the cloud. Where the migration status indicates a previous migration operation as being already started, and the batch timestamp indicates to be within a predetermined time, the migration engine precludes execution of a new migration operation. The predetermined time is indicative of batch processing that is merely time-consuming, rather than stalled completely (e.g., due to loss of network connectivity).

20 Claims, 14 Drawing Sheets

(56) References Cited

U.S. PATENT DOCUMENTS

| | | | | |
|---|---|---|---|---|
| 5,884,035 A * | 3/1999 | Butman | | G06F 16/958 |
| | | | | 707/E17.116 |
| 6,026,430 A * | 2/2000 | Butman | | H04L 61/30 |
| | | | | 709/227 |
| 6,377,993 B1 * | 4/2002 | Brandt | | H04L 65/401 |
| | | | | 709/227 |
| 2002/0046253 A1 * | 4/2002 | Uchida | | H04L 63/02 |
| | | | | 709/217 |
| 2008/0177994 A1 * | 7/2008 | Mayer | | G06F 16/00 |
| | | | | 709/224 |
| 2008/0229419 A1 * | 9/2008 | Holostov | | G06F 21/564 |
| | | | | 726/24 |
| 2012/0166582 A1 * | 6/2012 | Binder | | G06F 7/58 |
| | | | | 709/217 |
| 2013/0318594 A1 * | 11/2013 | Hoy | | G06F 9/45558 |
| | | | | 726/15 |
| 2014/0258705 A1 * | 9/2014 | Roskind | | H04L 63/0254 |
| | | | | 713/150 |
| 2015/0310188 A1 * | 10/2015 | Ford | | H04L 63/0428 |
| | | | | 726/28 |
| 2017/0041296 A1 * | 2/2017 | Ford | | G06F 21/64 |
| 2017/0131994 A1 * | 5/2017 | Middleton | | H04W 4/80 |
| 2017/0223003 A1 * | 8/2017 | Miles | | G06F 21/6254 |
| 2017/0346851 A1 * | 11/2017 | Drake | | H04L 9/0838 |
| 2018/0012032 A1 * | 1/2018 | Radich | | H04L 9/30 |

OTHER PUBLICATIONS

Anonymous "Comment Encryption Within Customer Landscape", 2021, 23 pages.

* cited by examiner

ROLLBACK OF COMMENT MIGRATION TO CLOUD STORAGE

BACKGROUND

Unless otherwise indicated herein, the approaches described in this section are not prior art to the claims in this application and are not admitted to be prior art by inclusion in this section.

Multiple software applications are increasingly subject to complex deployments in one or more cloud environments. In one possible example, software used to perform analytics upon current activity, may need to efficiently communicate with separate applications relating to the availability of resources and the forecasting of future activity.

The insertion of user comments can facilitate effective collaboration between different users for these purposes, possibly resulting in the discovery of valuable insights. By analyzing multiple visualizations of data, various users can contribute their insights in the form of comments, and thereby communicate specific observations to other users.

SUMMARY

Confidentiality and privacy of user comments stored on the cloud, are protected by encryption. A crypto server, and a browser including a migration engine, are located across a firewall from the cloud storage. In response to a migration instruction (e.g., received from an administrator), the migration engine utilizes batch processing to efficiently accomplish mass •onboarding, •offboarding, or •key rotation for comments stored on the cloud. To allow for graceful rollback, prior to initiating a migration operation the migration engine checks a migration status and a batch timestamp stored on the cloud. Where the migration status indicates a previous migration operation as being already started, and the batch timestamp indicates to be within a predetermined time, the migration engine precludes execution of a new migration operation. The predetermined time is indicative of batch processing that is merely time-consuming, rather than stalled completely (e.g., due to loss of network connectivity).

The following detailed description and accompanying drawings provide a better understanding of the nature and advantages of various embodiments.

DETAILED DESCRIPTION

Described herein are methods and apparatuses that perform rollback of comment migration according to an embodiment. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
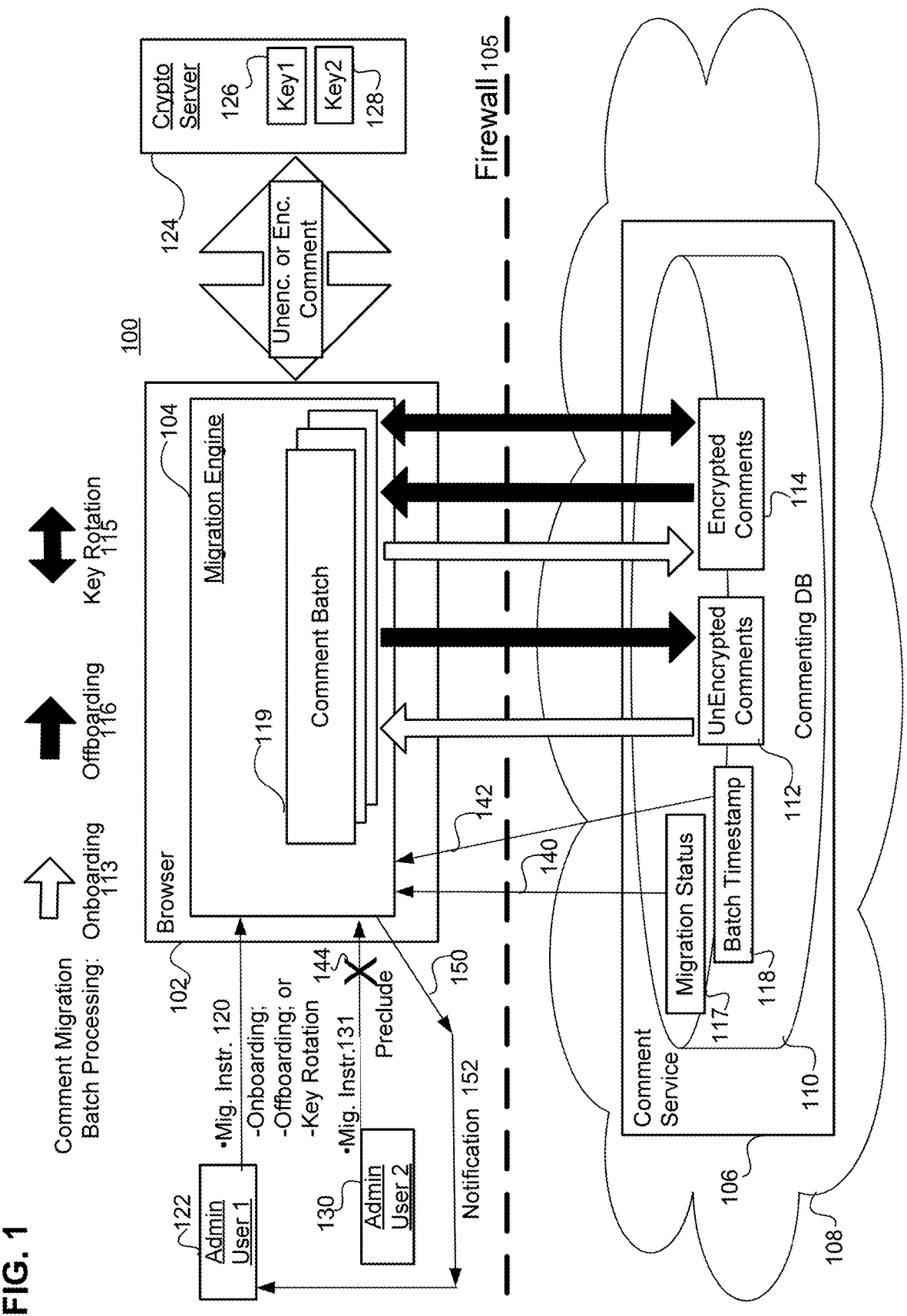
FIG. 1 shows a simplified diagram of a system according to an embodiment.

FIG. 1 shows a simplified view of an example system that is configured to implement comment migration according to an embodiment. The system 100 comprises a browser 102 that includes a migration engine 104.

The browser is positioned across a firewall 105 (e.g., on-premise) from a comment service 106 that is present in the cloud 108. The comment service references a commenting database 110.

The commenting database may include comments in unencrypted form 112. Such unencrypted comments may be eligible for onboarding migration operations 113 as is discussed herein.

The commenting database may include comments in encrypted form 114. Such comments are eligible for a key rotation migration operations 115 in order to strengthen their security.

Moreover, the encrypted comments stored in the commenting database are also eligible for offboarding comment migration operations 116. Such offboarding may occur where a customer decides to opt out of having the comments stored on the cloud by the commenting service in encrypted form.

The commenting database also includes a stored migration status 117. The migration status indicates the status of any comment migration operation. For example, the migration status may be STARTED to reflect that an ongoing comment migration operation is currently in progress. Alternatively, the migration status may be SUCCESS or FAILURE to indicate a comment migration operation that is not ongoing.

The commenting database also includes a stored batch timestamp 118. The stored batch timestamp is updated only at the conclusion of successful processing of a batch 119 during a comment migration operation. Thus as described herein, the elapse of a longer period of time since the stored batch timestamp, can be indicative of either:

time-consuming processing of a comment batch during a migration operation; or failed processing of a comment batch during the migration operation.

Both the migration status and the batch timestamp are referenced by the migration engine in order to effect efficient handling of comment migration operations. In particular, as shown in FIG. 1, based upon a first comment migration instruction 120 (received, e.g., from a first administrative user 122), the migration engine may undertake to perform batch processing of comments with the comment service.

Such batch comment processing may comprise an onboarding operation, where unencrypted comments present in the commenting database are retrieved by the migration engine, forwarded to a crypto server 124, encrypted using a key (e.g., key1 126), and then sent back across the firewall in encrypted form for cloud storage.

Batch comment processing may comprise an offboarding operation. There, encrypted comments present in the commenting database are retrieved by the migration engine, forwarded to the crypto server, decrypted using a key (e.g., key1), and then sent back across the firewall in decrypted form.

Batch comment processing may also comprise a key rotation operation. There, encrypted comments in the commenting database are retrieved by the migration engine, forwarded to the crypto server, decrypted using a first key (e.g., key1), reencrypted using a different key (e.g., key2 128), and then sent back across the firewall in encrypted form.

Comment migration processes may be mass operations, involving the handling of large volumes of comments. As described herein, such migration operations may involve the processing of comments in batches in order to achieve efficient handling and not overwhelm the browser.

During such processing of mass comment migration operations, it is possible that one or more batch communications may fail. Such failure can be attributable, e.g., to interruption of network communications.

In order to recognize such failed comment migration processing, and thereby allow for effective rollback and retry of comment migration, embodiments reference the migration status and batch timestamp information. Specifically, the migration engine is initially responsible for:
changing the value of the migration status to started upon receiving a mass migration instruction; and
updating the batch timestamp value only upon successful completion of processing of a comment batch.

Then, a second administrative user 130 may provide a second comment migration instruction 131 to the migration engine. (That second administrative user may be unaware of the activities of the first administrative user).

Accordingly, when any comment migration instruction is received, the migration engine retrieves 140 and checks the value of the migration status. If the migration status indicates completion (e.g., success or failure), the migration engine is free to process the new comment migration instruction incoming from the second administrative user.

If, however, the migration status indicates pending (e.g., started), the migration engine then retrieve 142 and checks the batch timestamp for an updated value falling within a period indicative of a stalled comment migration (e.g., last update is more than 10 minutes ago). Where the batch timestamp has been updated within that time period, the existing migration operation is deemed to be ongoing (albeit time-consuming), and reset is not allowed. Initiation of new migration operation is precluded 144 by the migration engine.

Where, however, the batch timestamp has not been updated within that time period, the existing migration operation is deemed to be stalled. The migration engine sets the value of the migration status stored on the cloud to completed (e.g., failed). A new comment migration operation is initiated, and the batch timestamp is updated. According to some embodiments, the migration engine may communicate 150 a notification 152 to advise the first administrative user of the situation.

While the particular embodiment of FIG. 1 shows the second administrative user sending the comment migration instruction to the same browser (and migration engine) as the first administrative user, this is not mandatory. According to alternative embodiments, the second administrative user could instead communicate with a separate browser (and migration engine).

According to such an alternative embodiment, the migration engine of that separate browser would access the values for migration status and batch timestamp previously stored on the cloud by the original migration engine. Referencing those stored values, the other migration engine would determine whether a new comment migration operation should be precluded, or is in fact able to be initiated.

Figure 2:
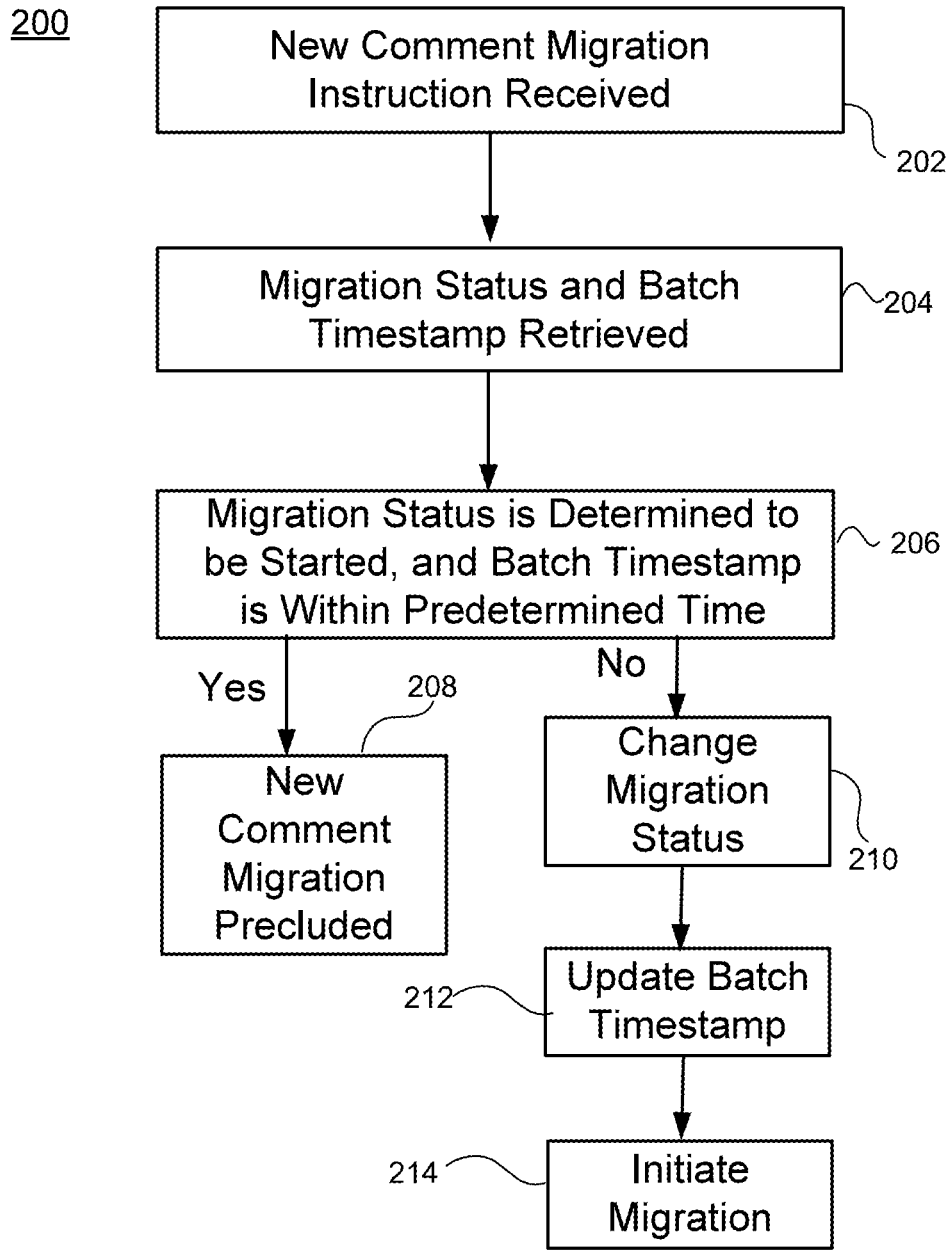
FIG. 2 shows a simplified flow diagram of a method according to an embodiment.

FIG. 2 is a flow diagram of a method 200 according to an embodiment. At 202, a comment migration instruction is received by a migration engine of a browser that is located across a firewall from cloud comment storage.

At 204, in response to the comment migration instruction, the migration engine retrieves from storage across the firewall, a value of a migration status and a value of a batch timestamp.

At 206, the migration engine determines that the value of the migration status is started, and that the batch timestamp is within a predetermined time. At 208, the migration engine precludes execution of the comment migration instruction.

In the event it is determined that:
the value of the migration status is completed, or
the value of the migration status is started but the batch timestamp is outside the predetermined time,
then the migration status is changed to completed 210, the timestamp is updated 212, and the new comment migration operation is initiated 214.

Further details regarding comment migration according to various embodiments, are now provided in connection with the following example.

EXAMPLE

An example of an embodiment of performing comment migration is now described in connection with the SAP Analytics Cloud (SAC) available from SAP SE of Walldorf, Germany. SAC is a cloud platform that combines analytics and predictive capabilities.

The analytics content (e.g., model, story, visualizations) promotes the discovery of previously unrecognized patterns in order to boost productivity. Hence, allowing multiple users to collaborate across analytics content is useful.

Commenting under SAC offers the ability to collaborate without having to exit the application. Such commenting may offer one or more of the following characteristics.
1. rapid interaction between users;
2. offer context sensitive feedback on specific elements in a story, analytic application, and/or data point model;
3. act as an "Emphasizer", i.e. as a cover page or as a summary at the end of a report;
4. make normal report significantly more meaningful;
5. provide granular access control ie rights or access control;
6. tag users during comment—tagged users receive an email;

The emergence of cloud-based applications, has resulted in different traversal paths to the data, e.g., from on-premise to different nodes managed by the cloud. Eventually, however, at least some portion part of the data ends up stored outside premises on the cloud.

Such cloud storage can raise security concerns. In particular, relevant user comments that are part of data stored on the cloud are outside of an on-premises firewall, and at least theoretically subject to exposure.

Figure 3:
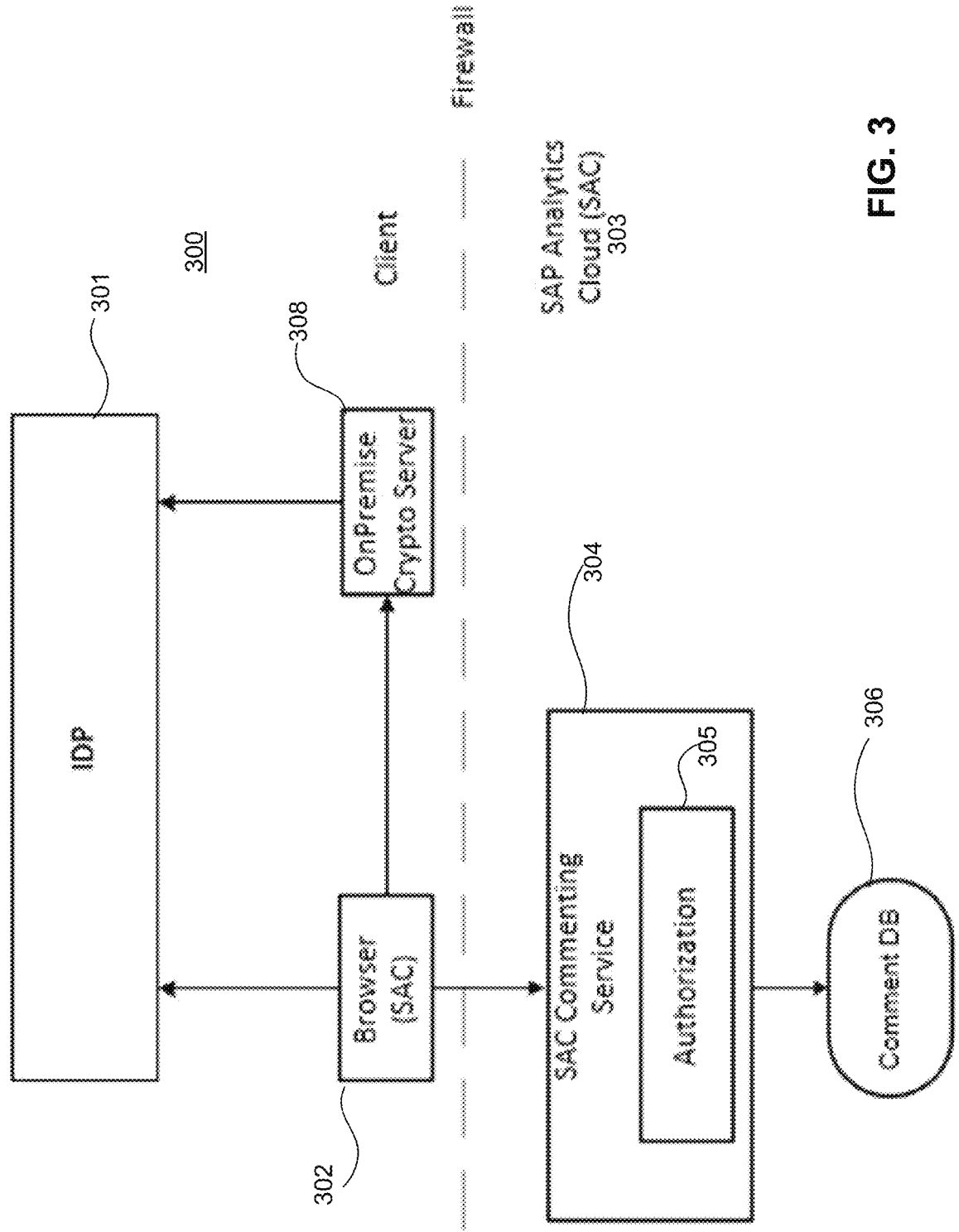
FIG. 3 shows an overview of a system according to an example.

Thus according to some embodiments, comments may be encrypted at the customer premises, with only encrypted comment text entering the SAP Cloud. FIG. 3 shows a simplified view of an architecture 300 according to an example that includes an Identify Provider (IDP) 301.

In particular, the browser layer 302 executes HTTP REST endpoints on SAC Commenting Service 304 of SAC 303 to add comments or retrieve existing comments. The SAC Commenting Service validates if the user has authorization 305 to gain access on the story, model, and dimensions contained in the payload. The SAC Commenting Service also facilitates the Create, Read, Update and Delete (CRUD) operations into the database 306.

The on-premise crypto server 308 is an additional server that is hosted on the customer premises. The role of the crypto server is to encrypt and decrypt the comment text that is passed as input.

Any comment that is to be saved within the SAC Commenting Service, would first be encrypted by the crypto server and only then be saved. Thus, the comment text ends up in SAC as an encrypted text that can only be decrypted by the appropriate crypto server.

Similarly, when comments are to be rendered on to the UI, the browser sends the encrypted text to the crypto server. That crypto server then decrypts the comments which are finally rendered on the UI.

The encryption of comments may be performed by keys that are periodically rotated. As the comments are encrypted outside SAC, but then migrated for storage within SAC, any key rotation procedure may ensure all the existing comments which are encrypted with an old key, are decrypted with same key before new key is applied.

Such key rotation should be implemented in a manner that ensures data confidentiality is maintained with respect to comments not leaving customer premises in clear text form. Moreover, as existing comments are to be migrated, issues of scale versus performance with key rotation may arise. In addition, comment migration should efficiently handle errors arising during the migration process and roll back to previous state. Lastly, service unavailability due to comment migration and key rotation should be minimal.

Figure 4:
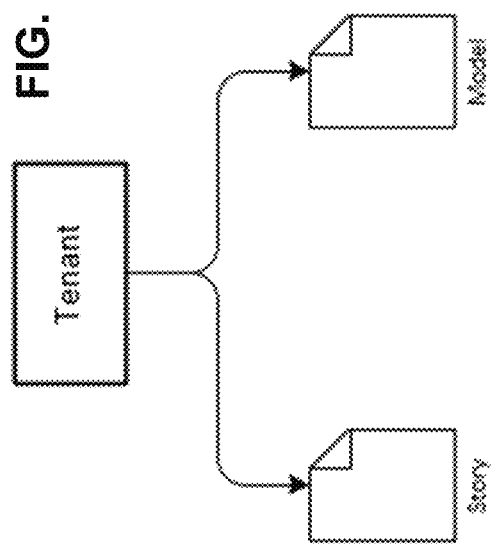
FIGS. 4-7 show possible use cases.

A number of different possible use cases for comment migration may arise. For example, FIG. 4 shows comments associated with analytic content in the form of a story artifact.

Figure 5:
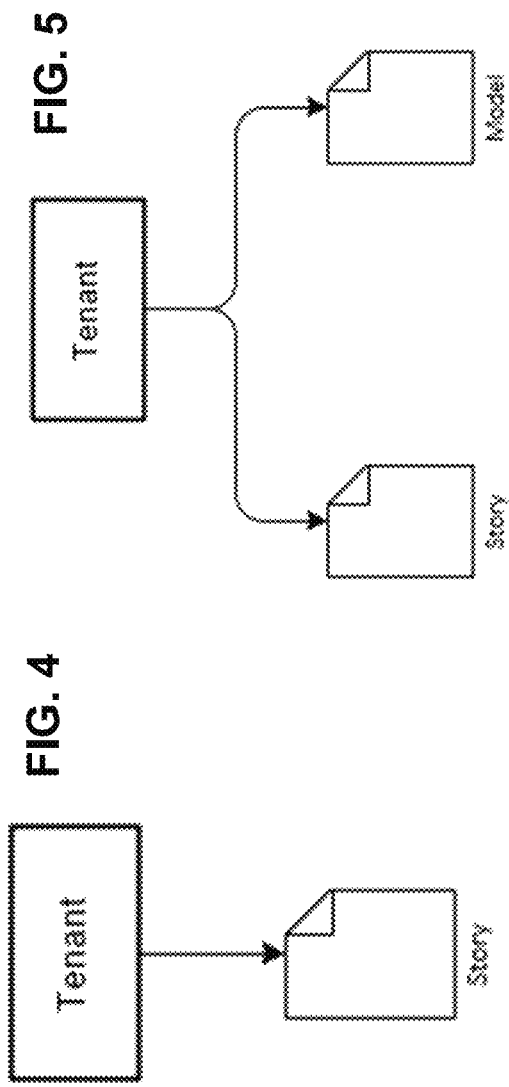
Figure 7:
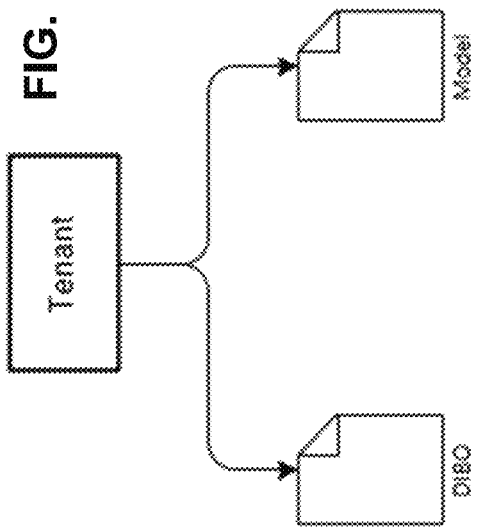
Figure 6:
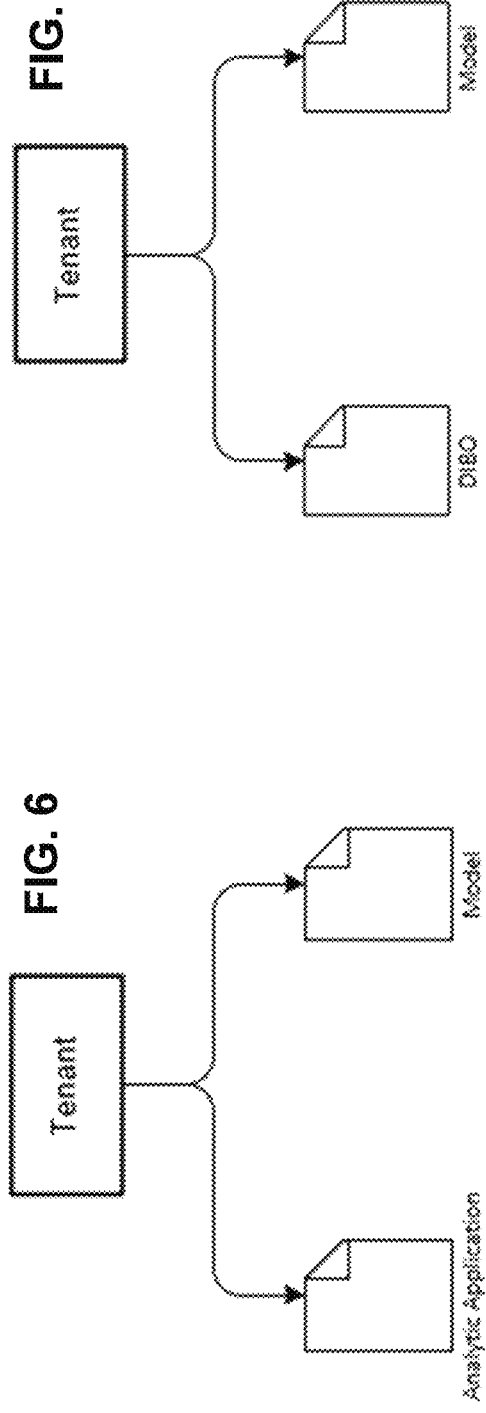

In addition, FIG. 5 shows comments associated with story and model artifacts. FIG. 6 shows comments associated with analytic application and model artifacts. FIG. 7 comments associated with Digital Boardroom (DIBO) and model artifacts.

Figure 8:
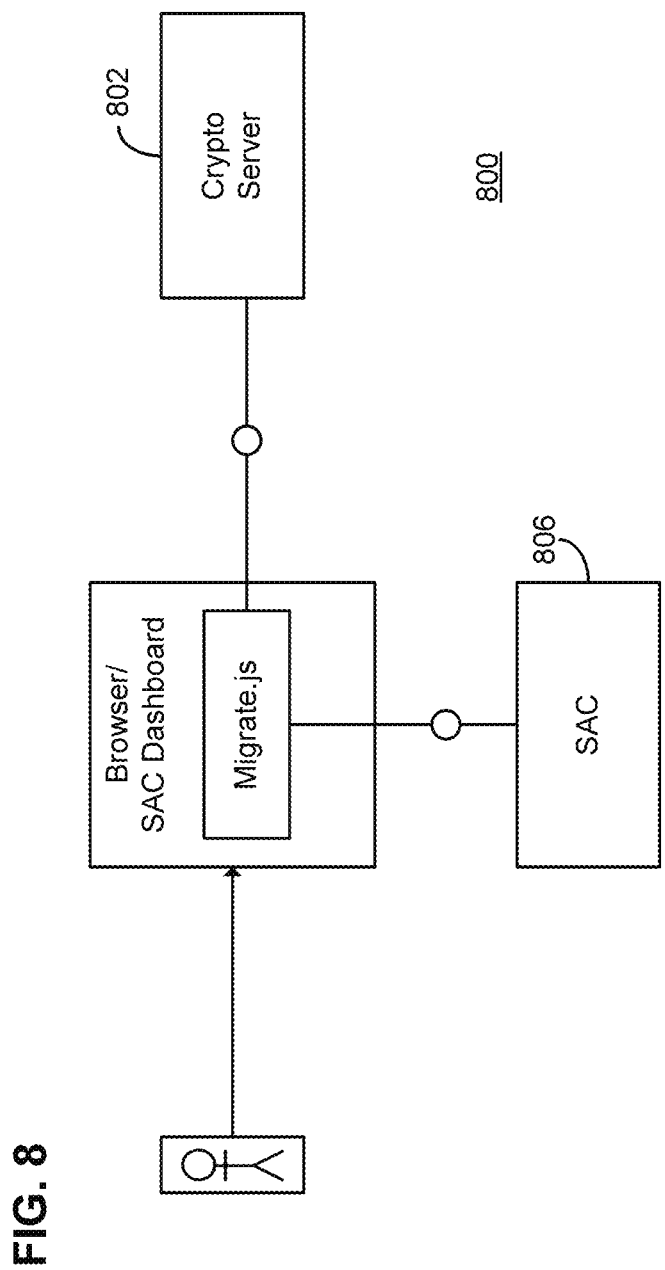
FIG. 8 shows an overview of the role of a crypto server according to an embodiment.

In order to accommodate these use cases in the context of key rotation, embodiments implement a light weight browser to orchestrate support for migration of comments from plain-text to encrypted and vice-versa, and to support key rotation. FIG. 8 shows a simplified view of such a browser orchestrated migration architecture.

This architecture 800 implements the on-premises crypto server 802 which would be installed and run within the customer's firewall, and interact smoothly with the existing SAC platform 806. Comments are migrated by the on-premises crypto server, but continue to reside within SAC landscape.

As part an onboarding procedure, new customers board onto the encryption feature. After onboarding, any new comments will be encrypted by default.

Figure 15A:
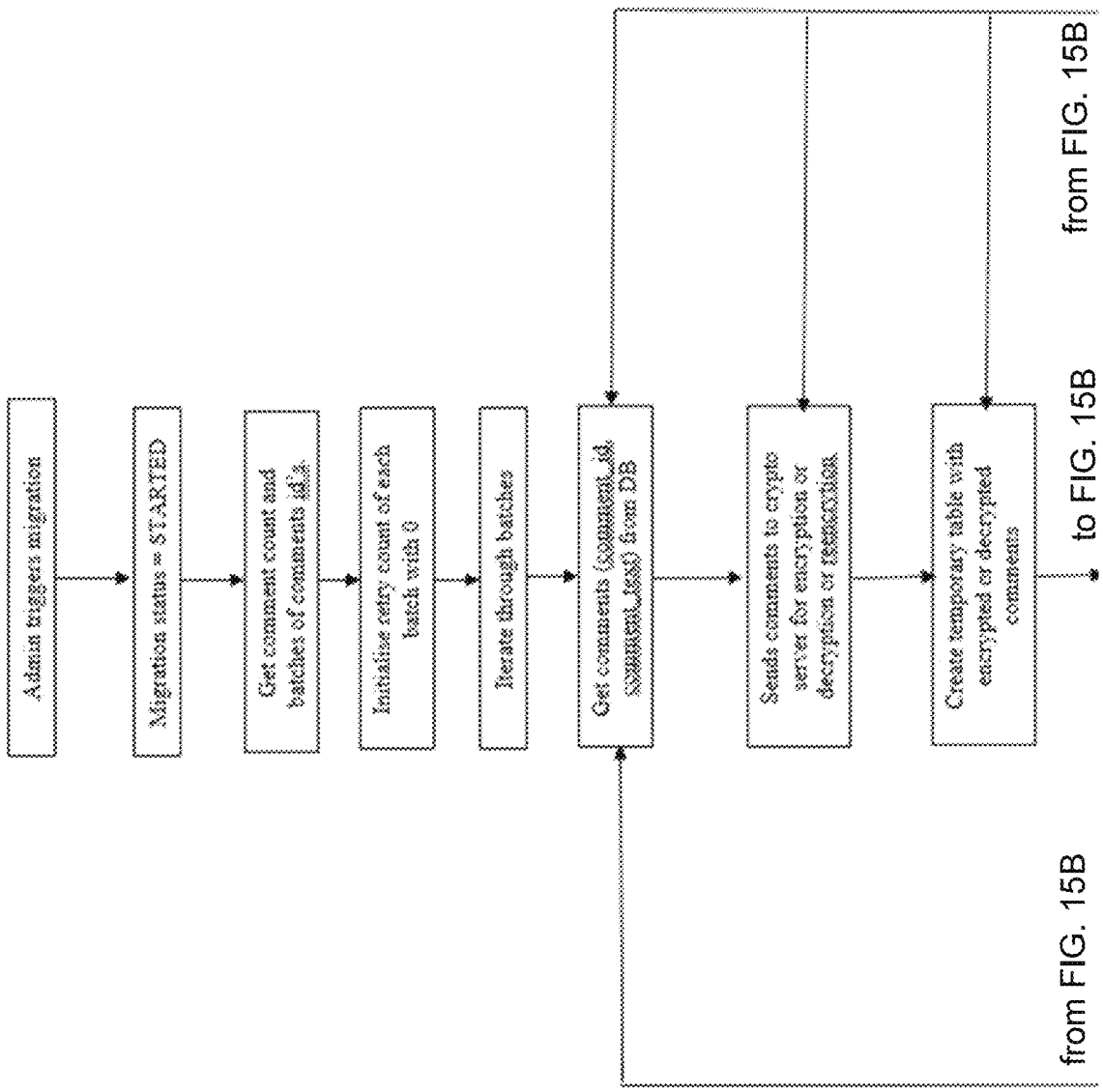
FIGS. 15A-B show a process flow according to an example.
Figure 15B:
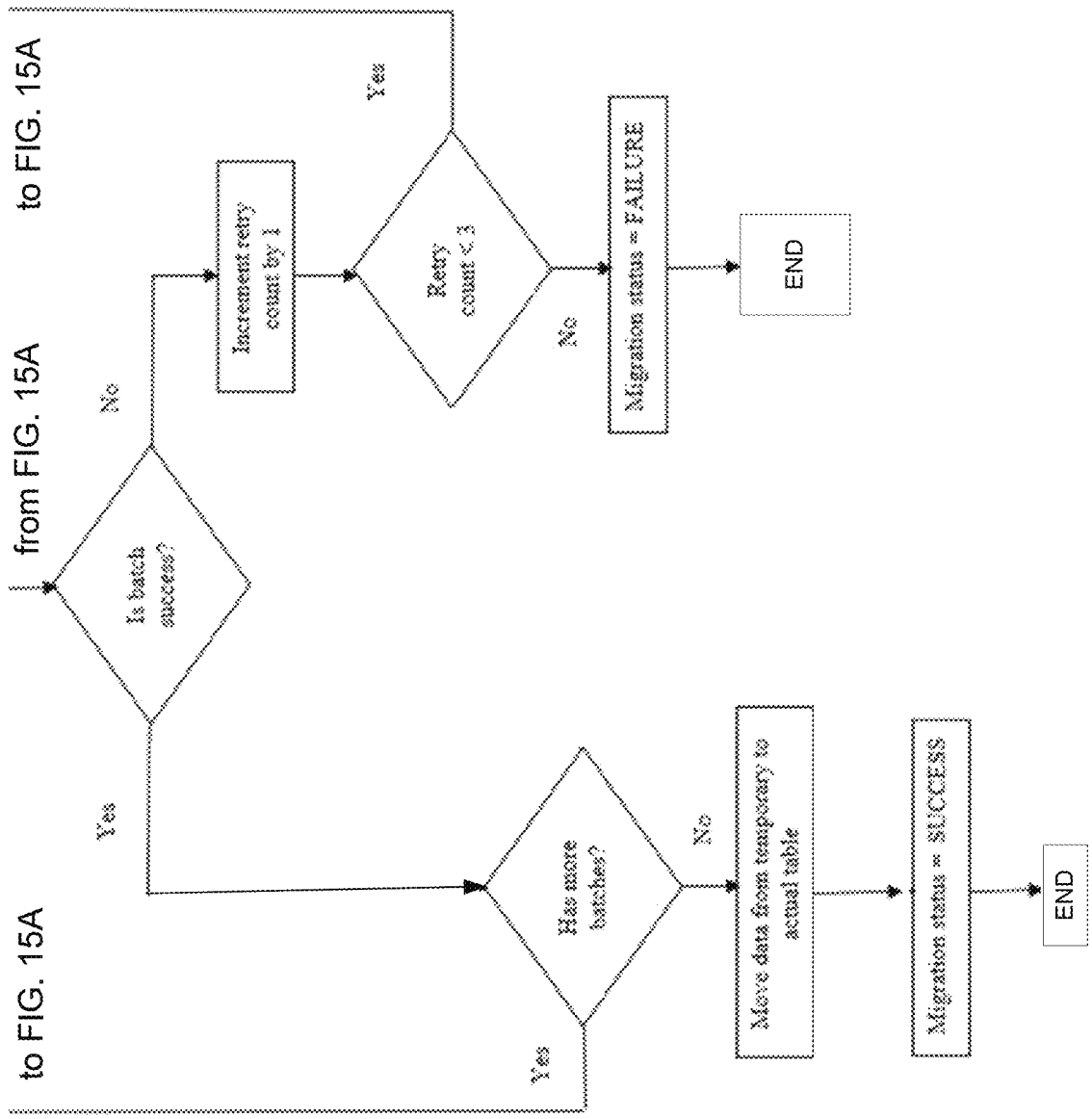

FIGS. 15A-B (discussed later below) show details of a migration process flow.

Figure 9:
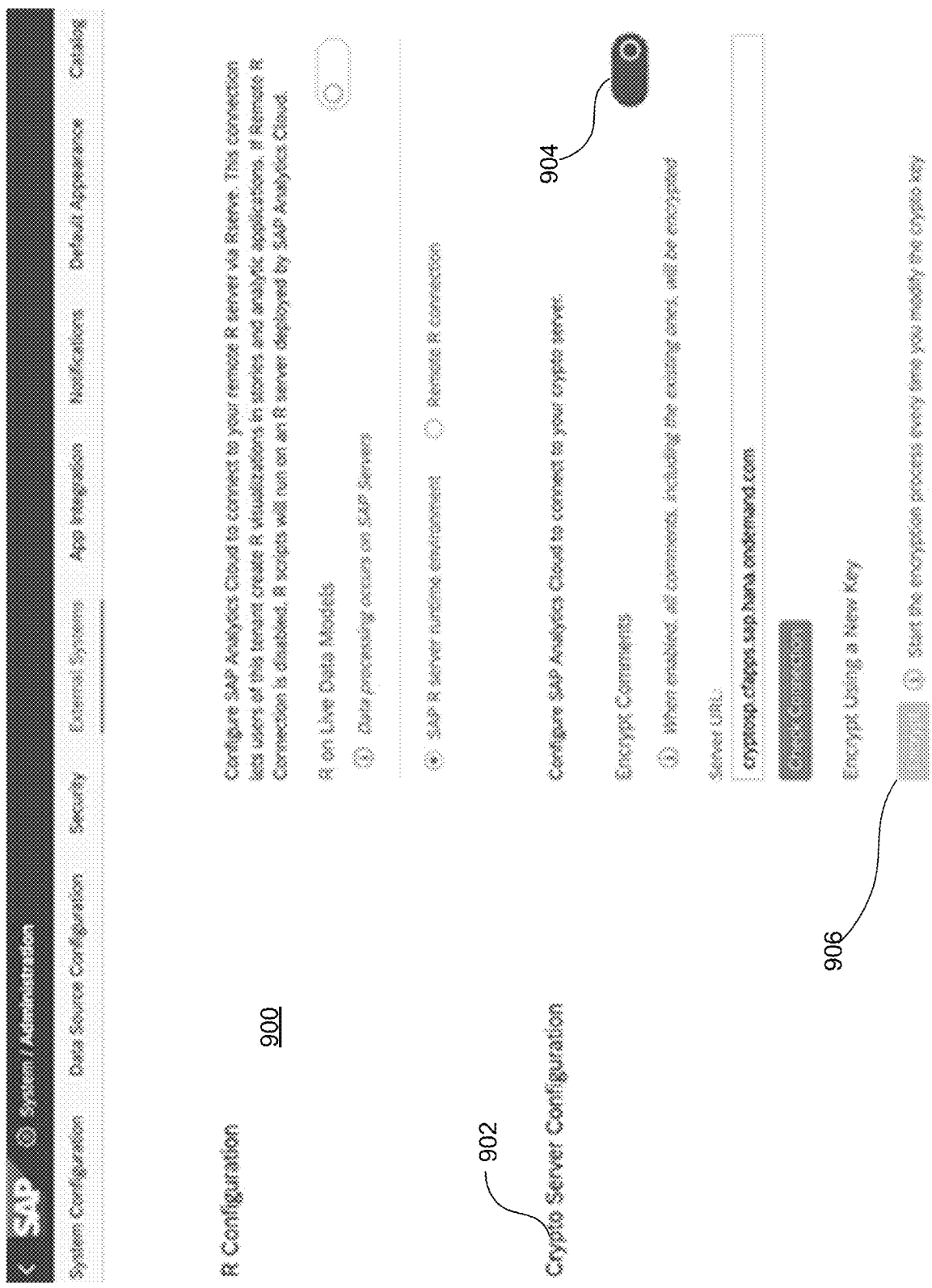
FIG. 9 shows a sample screen shot of an example user interface.

FIG. 9 is a UI screenshot 900 showing an encryption option 902. In the screen shot that is shown, toggle 904 is set activated, instructing an onboarding migration operation. Setting that toggle to unactivated, would instead instruct an offboarding migration operation. Activating the encrypt button 906 would instruct a key rotation migration operation.

As part of an offboarding procedure, a customer may want to opt-out of the encryption feature. Existing encrypted comments would be decrypted and reverted to the standard comment behavior, being stored as plain text by default.

As part of key rotation procedure, encrypted comments would be decrypted with the current key and re-encrypted with new key. Such key rotation may be due to a security policy or system compromise.

Further details of migration rollback according to this example, are now provided. In order to maintain data confidentiality, the browser-based solution ensures that no comments reach SAC in plain-text.

Figure 12:
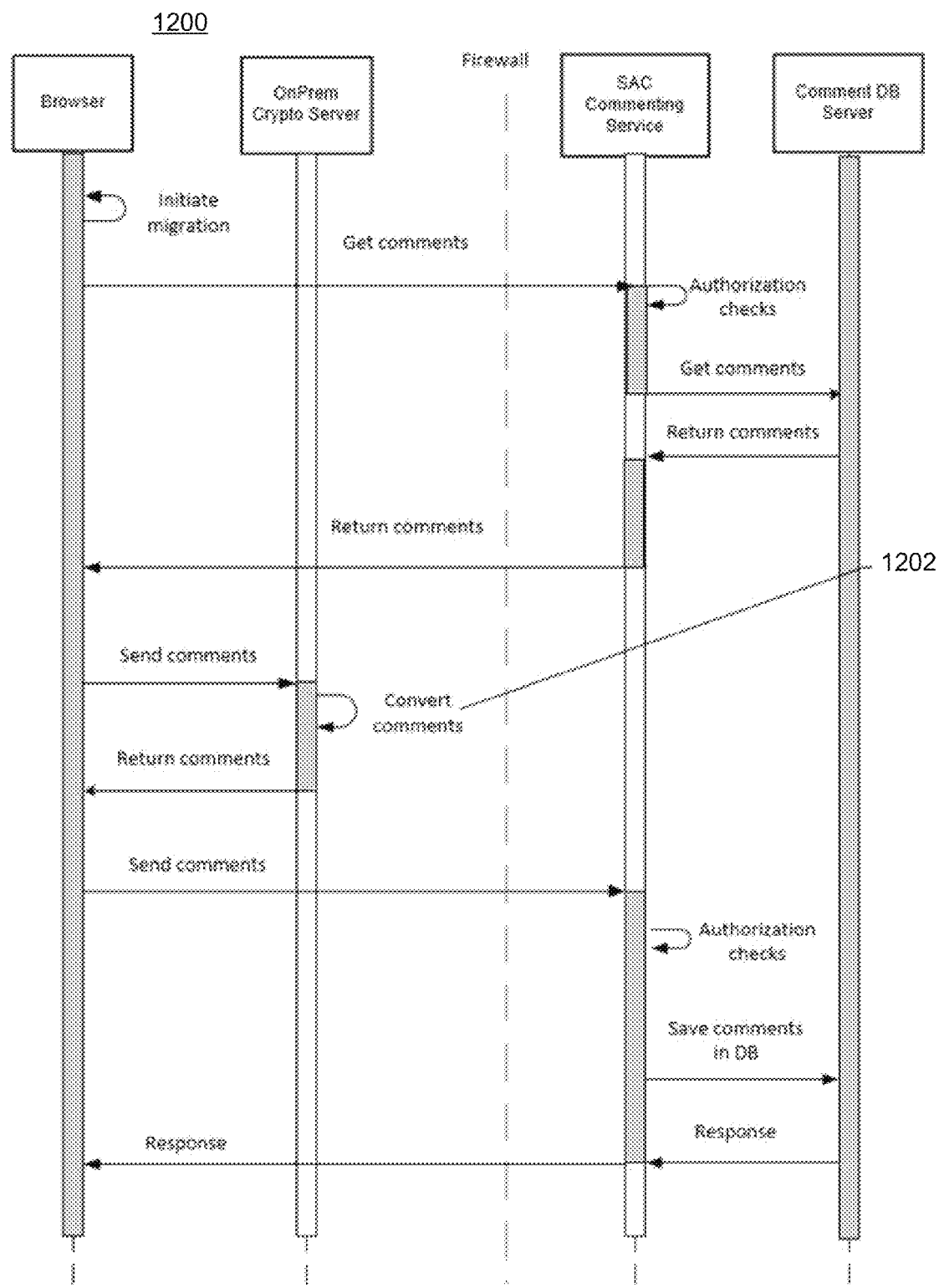
FIG. 12 shows an example process flow of migration according to an embodiment

In a browser orchestrated migration, comments are fetched from commenting service and forwarded to on-premise crypto server for conversion and then saved back into commenting database. FIG. 12 offers an overview of a migration flow 1200.

At 1202, comments are converted. Based on whether workflow is:
  encryption: convert from plain-text to encrypted text comment
  decryption: convert from encrypted to plain-text comment
  re-encryption: convert from encrypted (key1) to encrypted (key2) comment.

Figure 13:
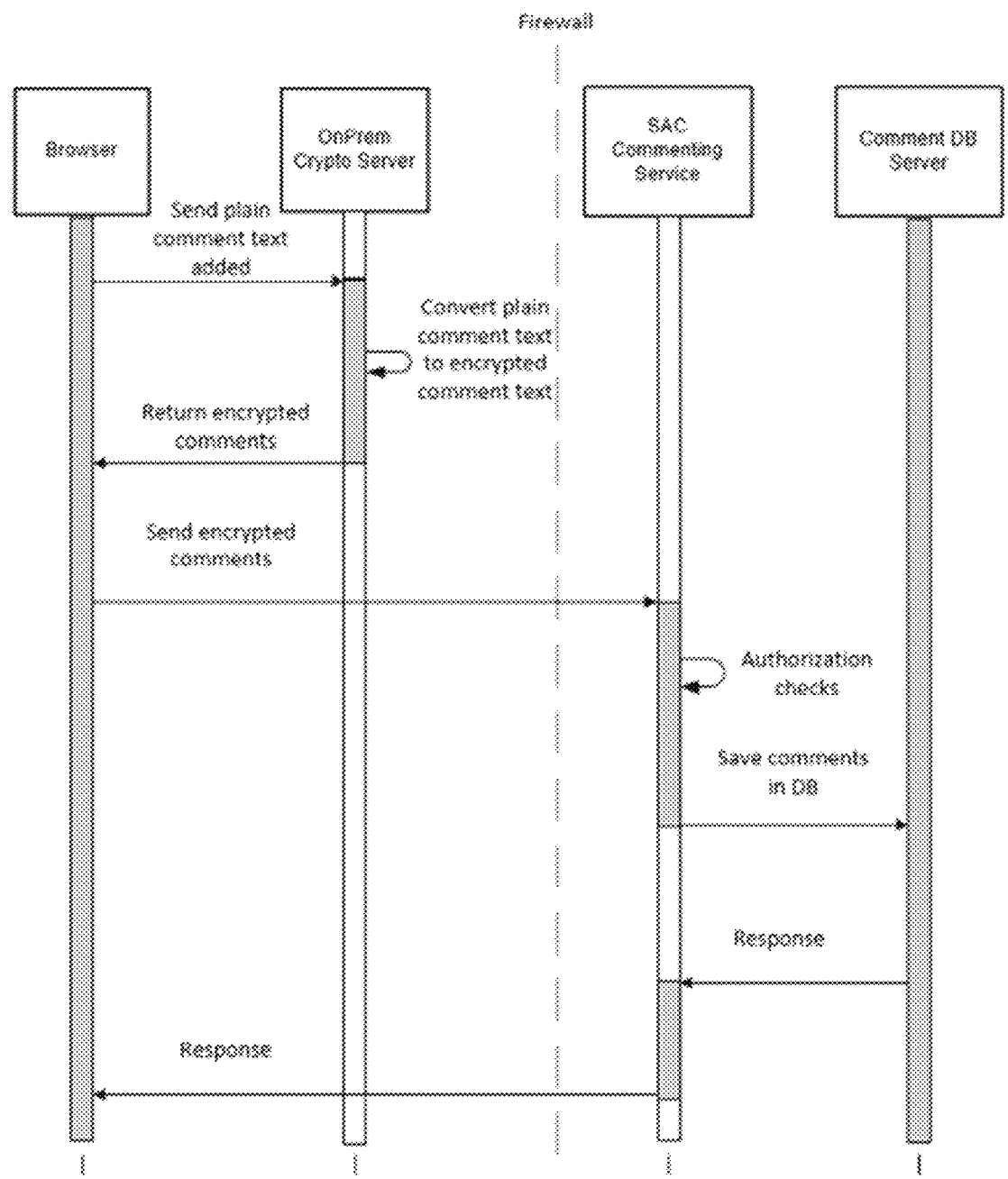
FIG. 13 shows an example process of a get comment work flow according to an embodiment.

It is noted that any commenting operation (e.g., to get or add comment) performed post migration, also involves the on-premise crypto server. Hence, without the appropriate on-premise crypto server, SAC would not be able to decrypt or make sense of the cryptic text. FIG. 13 shows an example get comment workflow.

Figure 14:
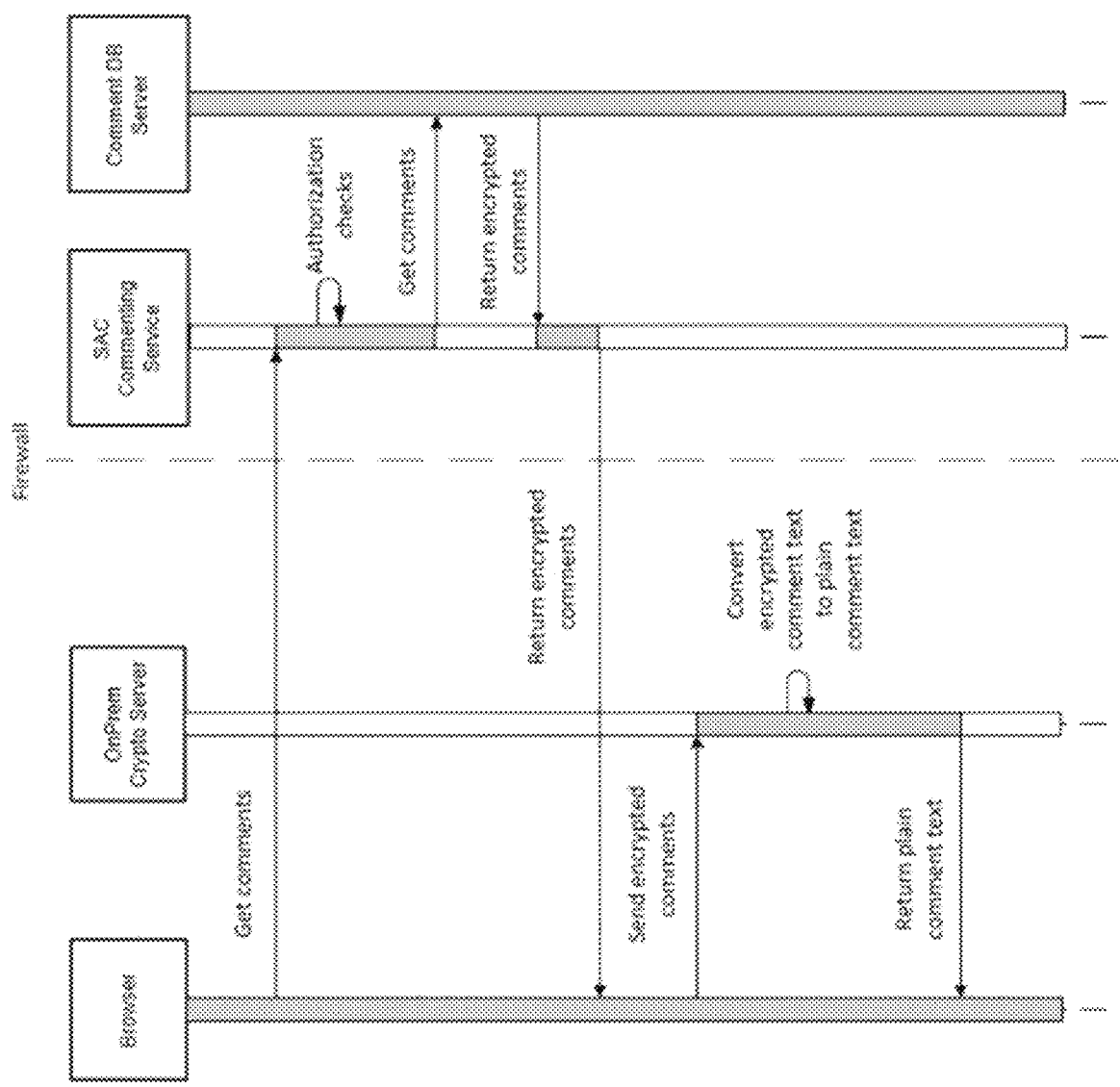
FIG. 14 shows an example process flow of an add comment work flow according to an embodiment.

The on-premise crypto server is responsible for encrypting the plain comment text. The SAC Commenting service is only responsible for storage of encrypted comment text. FIG. 14 shows an example add comment workflow.

Implementing comment migration may call for balancing scale versus performance. In particular, being a client tool, the browser is not expected to perform heavy processing.

Hence, comments are fetched in batches and sent to on-premise crypto server for encryption/decryption/re-encryption. The number of batches allowed, and the number of comments to be transferred in each batch, is configurable. Accordingly, this batch processing can be tuned to optimize throughput according to scale and performance.

Implementing comment migration may also call for rolling back to a previous state. The migrated comment-texts are saved to a temporary location on SAC to ensure maintenance of atomicity of the comment state. Failed batches are reattempted thrice before categorizing it as an error.

In case of error during migration, then this temporary data is discarded, and the old comment state is retained. This ensures that there is a graceful fallback to the old state.

A comment migration procedure according to an example is summarized below.

1. Admin provides on-premise crypto server details and triggers migration
2. Set the migration status to STARTED
3. Get comment count and generate batches of comments id's
   a. Query for comment count
   b. Iterate to create comment id batches of 1000 each
   c. Send comment count and batches
4. Iterator 'n' threads, here 'n' is user configurable
   a. Each batch per thread
      i. Get comments (comment id, comment text) from DB
      ii. Sends comments to on-premise crypto server to encryption or decryption
      iii. Inserts temporary table with encrypted or decrypted comments
   b. Is batch successful:
      i. Release thread back to thread pool
      ii. Check if more batches are pending
      iii. If yes, execute next batch
   c. If any of the steps in 4.a above fails, then retry that step until it is successful or last updated timestamp exceeds limit
      i. Updated timestamp exceeds limit and batch processing failed then
         1) Sets the migration status to completed—FAILURE
         2) Stop migration operation
      ii. last updated timestamp does not exceed limit then
         1) Continue step 4.b
   d. After all batches are successfully processed, then comments are moved to actual table
      i. Sets the migration status to completed—SUCCESS FIGS. 15A-B explain steps that are involved during migration according to an embodiment.

It is desirable that service unavailability due to comment migration be minimized to the extent possible. As the migration process updates the temporary location, read operations on existing comments are permitted.

Only write-operation on comments is blocked until the migration process is complete. This ensures commenting service unavailability is reduced to only write-operations during migration.

A procedure for this is described below:
1. User performs commenting operations (read, add, delete)
2. Backend upon receiving the request would check the request action type
3. We maintain a whitelist of allowed action types like:
   a. getThreads
   b. getDatapointThreads
4. If whitelisted action, then proceed with request processing and return response
5. Else reject the request In this example, only an administrative (Admin) user is authorized to change the encryption related configurations and trigger migration. Only one active migration operation is permitted at any point in time.

Thus, the comment migration is controlled by the browser. As the number of comments to migrate could be huge, comments may be batched and accordingly migrated, rather than migration being performed in a single call.

As the migration process is browser orchestrated, it is conceivable that more than one administrator may seek to start the same workflow in parallel. This could lead to race-conditions and data corruption in certain scenarios.

Thus in order to avoid parallel migrations initiated by multiple admins, the migration status is introduced and referenced. The comment migration being a heavyweight process that runs in batches, it is desired that failure should lead to a graceful rollback to the previous state.

Embodiments allow differentiating between a long-running migration process and one that has failed entirely (e.g., by way of browser closure, network connectivity issues, etc.). In the former (e.g., long-running) case, starting a new migration should not be allowed/is precluded. In the latter (e.g., stalled) case, starting a new migration should be allowed.

Figure 10:
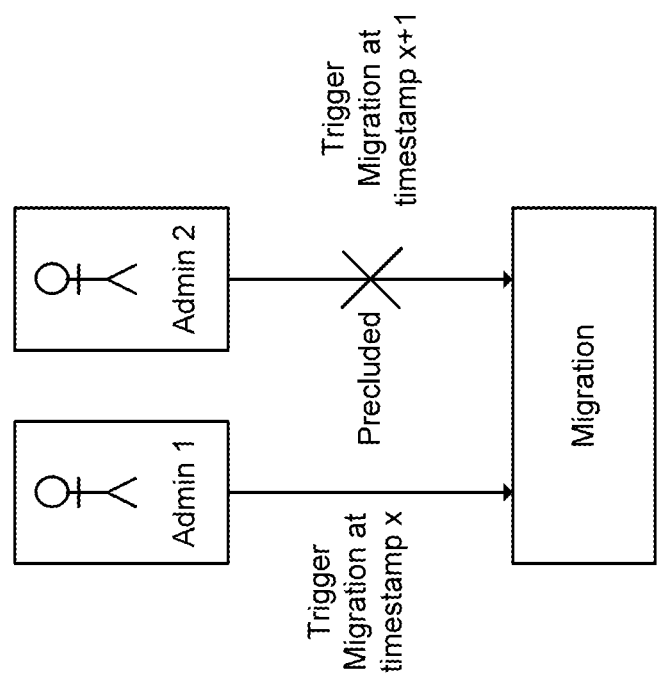
FIG. 10 is a simplified diagram showing a restriction on comment migration according to an embodiment.

FIG. 10 shows that migration initiated by admin should be restricted when there is an active migration in process. The admin might use the same browser to re-trigger the migration workflow. Or, the admin might use a browser from a different device altogether. In either case, only one migration at a time should be allowed.

Accordingly, embodiments add the migration status to the commenting database and ensure that no migrations are allowed once the migration-status is set to STARTED. New-Migrations will be allowed only when this state changes to COMPLETED (SUCCESS or FAILED).

If the browser stalls or crashes for some reason, or if the browser is closed abruptly, then the value of the migration status is to be reset so that new migrations can be allowed. Such circumstances can happen due to network failures, say if the device on which the browser is running loses internet connectivity etc.

As comment migration according to embodiments is browser-based, there is no scope for server to auto-correct itself. The server expects the state to be reset by the browser.

Such reset is achieved by introducing another parameter—in this particular example named "batch_updated_timestamp". That parameter is updated by the browser for each batch of comments that have been successfully migrated.

Whenever a new migration is to be started then this timestamp is evaluated to check if it has been updated in the last 10 minutes (or not). If update has taken place, then migration is not allowed.

In one example, a typical batch (of 10,000 comments) takes less than 6 minutes for migration. Thus in some embodiments 10 minutes may be taken as an effective time limit against which stalled migration may be evaluated.

It is noted that the migration rollback according to this example does not introduce new timers/jobs on the server-side to poll the migration status. Instead, the next call made by the administrator relies upon "batch_updated_timestamp" parameter in order to re-trigger migration. Such an approach avoids additional tracking by the server.

Figure 11:
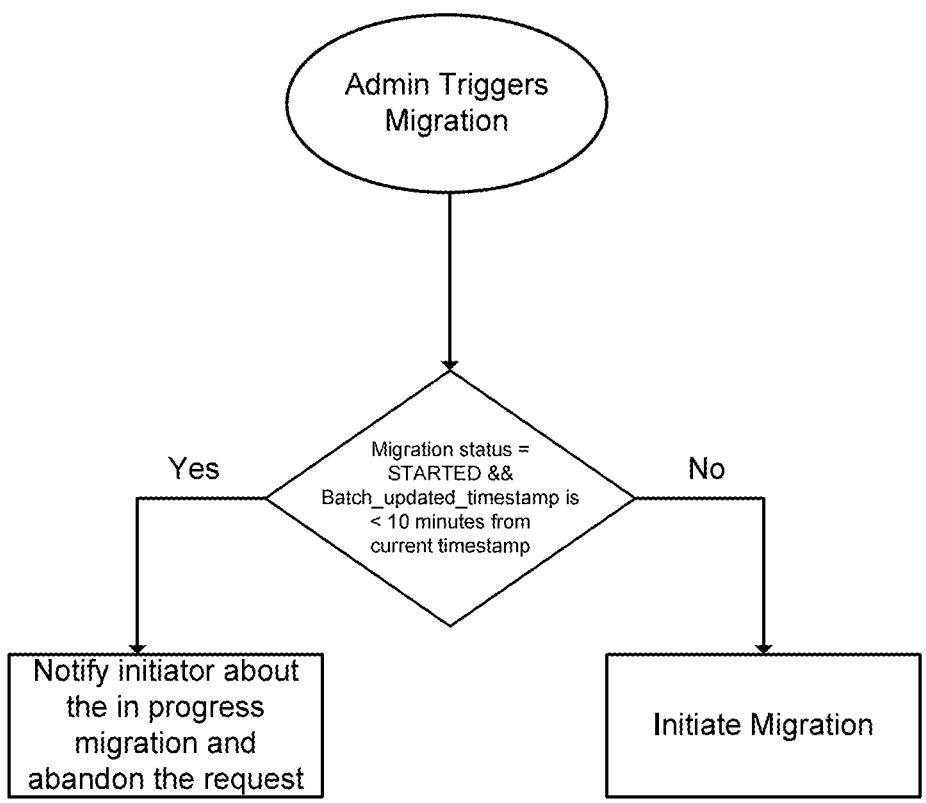
FIG. 11 is a simplified diagram showing a process flow of active migration evaluation according to an exemplary embodiment.

FIG. 11 explains steps involved in active migration evaluation according to an embodiment.

1. Admin provides on-premise crypto server details and triggers migration
2. Check the migration status
3. If migration status is "STARTED"
   a. calculate the time lapse between current timestamp and "batch_updated_timestamp".
   b. If time lapse is more than 10 minutes, proceed with migration.
   c. Else notify user, there is an already active migration and abandon this request.
4. Else trigger new migration and update migration status as "STARTED"

Embodiments may offer one or more benefits. For example, embodiments may reduce the burden imposed on system components.

In particular, embodiments provide a heartbeat mechanism without polling. Comment migration failure is thus able to be detected "on demand", as soon as the next call is made. Polling by the server is not needed to detect failure of a migration operation.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. Computer implemented system and methods comprising:
- a first browser located behind a firewall,
- receiving a comment migration instruction;
- in response to the comment migration instruction, retrieving from storage across the firewall, a value of a migration status and a value of a batch timestamp;
- determining that the value of the migration status is started, and that the batch timestamp is within a predetermined time; and
- precluding execution of the comment migration instruction.

Example 2. The computer implemented system and method of Example 1 wherein the value of the migration status and the value of the batch timestamp are saved to the storage in response to a previous comment migration instruction.

Example 3. The computer implemented system and method of Example 1 or 2 wherein the value of the batch timestamp is stored based upon successful processing of a batch of comments across the firewall.

Example 4. The computer implemented system and method of Example 3 wherein the batch of comments is unencrypted.

Example 5. The computer implemented system and method of Example 4 wherein the previous migration instruction comprises onboarding.

Example 6. The computer implemented system and method of Example 4 wherein the previous migration instruction comprises offboarding, and the batch of comments is decrypted by a crypto server located behind the firewall.

Example 7. The computer implemented system and method of Example 3 wherein the batch of comments is encrypted.

Example 8. The computer implemented system and method of Example 7 wherein the previous migration instruction comprises onboarding, offboarding, or key rotation; and the batch of comments is encrypted by a crypto server located behind the firewall.

Example 9. The computer implemented system and method of Examples 2, 3, 4, 5, 6, 7, or 8 wherein the previous migration instruction is received by a second browser.

Example 10. The computer implemented system and method of Examples 2, 3, 4, 5, 6, 7, or 8 wherein the previous migration instruction is received by a first browser.

Figure 16:
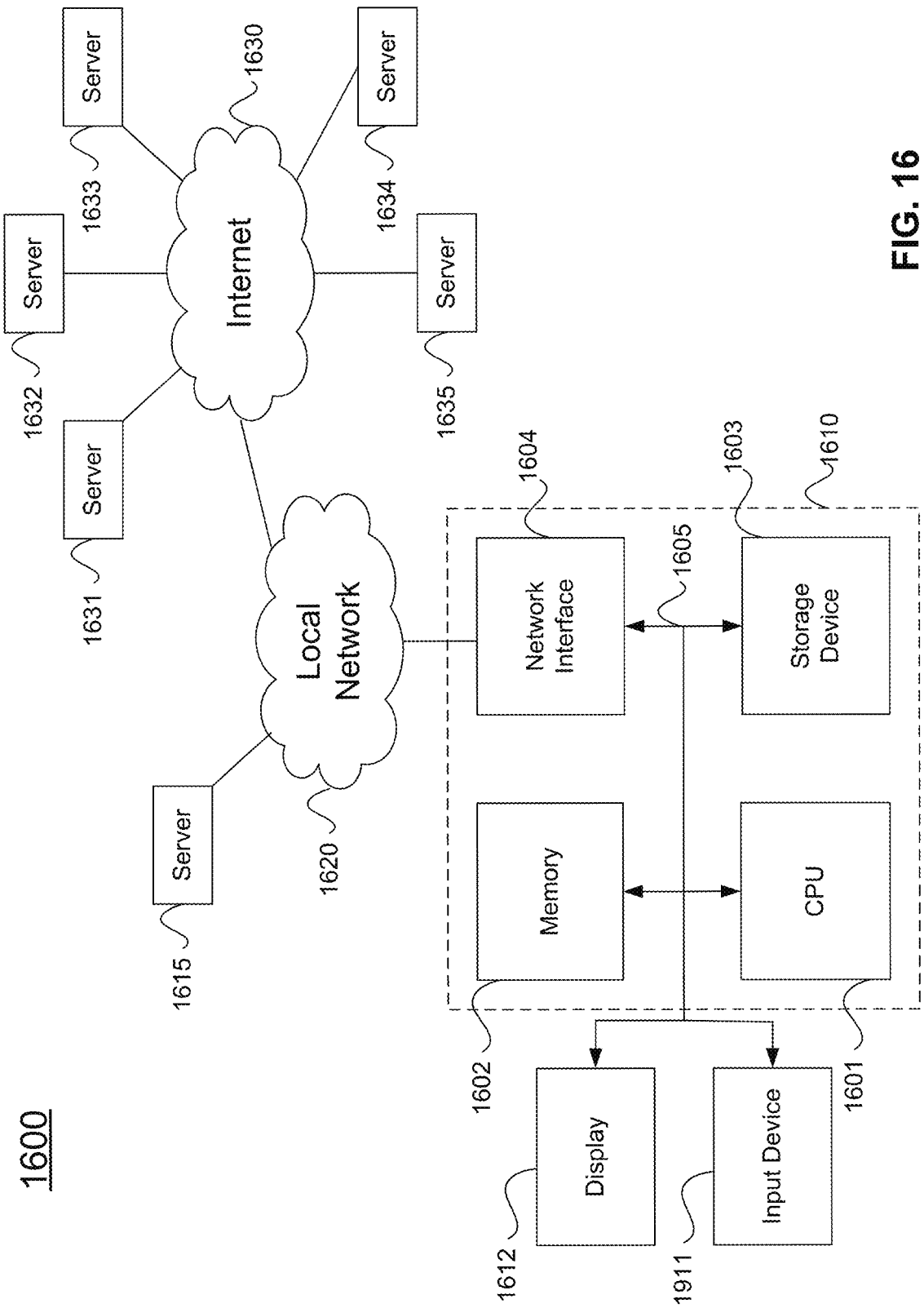
FIG. 16 illustrates an example computer system.

An example computer system 1600 is illustrated in FIG. 16. Computer system 1610 includes a bus 1605 or other communication mechanism for communicating information, and a processor 1601 coupled with bus 1605 for processing information. Computer system 1610 also includes a memory 1602 coupled to bus 1605 for storing information and instructions to be executed by processor 1601, including information and instructions for performing the techniques described above, for example. This memory may also be used for storing variables or other intermediate information during execution of instructions to be executed by processor 1601. Possible implementations of this memory may be, but are not limited to, random access memory (RAM), read only memory (ROM), or both. A storage device 1603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1603 may include source code, binary code, or software files for performing the techniques above, for example. Storage device and memory are both examples of computer readable mediums.

Computer system 1610 may be coupled via bus 1605 to a display 1612, such as a Light Emitting Diode (LED) or liquid crystal display (LCD), for displaying information to a computer user. An input device 1611 such as a keyboard and/or mouse is coupled to bus 1605 for communicating information and command selections from the user to processor 1601. The combination of these components allows the user to communicate with the system. In some systems, bus 1605 may be divided into multiple specialized buses.

Computer system 1610 also includes a network interface 1604 coupled with bus 1605. Network interface 1604 may provide two-way data communication between computer system 1610 and the local network 1620. The network interface 1604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1604 sends and receives electrical, electromagnetic, or optical signals that carry digital data streams representing various types of information.

Computer system 1610 can send and receive information, including messages or other interface actions, through the network interface 1604 across a local network 1620, an Intranet, or the Internet 1630. For a local network, computer system 1610 may communicate with a plurality of other computer machines, such as server 1615. Accordingly, computer system 1610 and server computer systems represented by server 1615 may form a cloud computing network, which may be programmed with processes described herein. In the Internet example, software components or services may reside on multiple different computer systems 1610 or servers 1631-1635 across the network. The processes described above may be implemented on one or more servers, for example. A server 1631 may transmit actions or messages from one component, through Internet 1630, local network 1620, and network interface 1604 to a component on computer system 1610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
   receiving, in a first browser located behind a firewall, a comment migration instruction to modify an encryption form of a plurality of comments stored in a cloud storage outside the firewall as a plurality of batches including a first batch;
   in response to the comment migration instruction, retrieving from cloud storage across the firewall, a value of a migration status of a previous migration instruction and a value of a batch timestamp for the first batch operated on by the previous migration instruction;
   determining that the value of the migration status is started, and that the batch timestamp is within a predetermined time;
   precluding execution of the comment migration instruction in response to the determination that the value of the migration status is started and the batch timestamp is within the predetermined time; and
   otherwise, initiating the comment migration instruction to perform a comment migration,
   wherein the comment migration is controlled by the first browser, and wherein during the comment migration, the first browser retrieves encrypted comments from the cloud storage through a commenting service outside the firewall, sends the encrypted comments to a crypto server behind the firewall to decrypt and re-encrypt the encrypted comments using a different encryption, receives re-encrypted comments from the crypto server, and stores the re-encrypted comments in the cloud storage through the comment service.

2. A method as in claim 1 wherein the value of the migration status and the value of the batch timestamp are saved to the storage in response to the previous comment migration instruction.

3. A method as in claim 2 wherein the previous comment migration instruction is received by a second browser.

4. A method as in claim 2 further comprising:
   prior to the receiving,
   the first browser receiving the previous comment migration instruction; and
   in response to the previous comment migration instruction, the first browser storing the value of the migration status and the value of the batch timestamp in the storage.

5. A method as in claim 2 wherein the value of the batch timestamp is stored based upon successful processing of a batch of comments in the plurality of batches across the firewall.

6. A method as in claim 5 wherein the batch of comments is unencrypted.

7. A method as in claim 5 wherein the previous migration instruction comprises onboarding.

8. A method as in claim 5 wherein:
   the previous migration instruction comprises offboarding; and
   the batch of comments is decrypted by a crypto server located behind the firewall.

9. A method as in claim 8 wherein the batch of comments is encrypted and wherein offboarding further comprises:
   forwarding, to the crypto server, the batch of comments;
   decrypting, by the crypto server, the batch of comments; and
   retrieving, from the crypto server, the batch of comments in decrypted form.

10. A method as in claim 9 wherein:
    the previous migration instruction comprises onboarding, offboarding, or key rotation, wherein key rotation comprises decrypting the plurality of comments before encrypting the plurality of comments such that the plurality of comments do not cross the firewall in decrypted form; and
    the batch of comments is encrypted by a crypto server located behind the firewall.

11. A non-transitory computer readable storage medium embodying a computer program for performing a method, said method comprising a first browser located behind a firewall:
    receiving, in the first browser located behind the firewall, a comment migration instruction to modify an encryption form of a plurality of comments as a plurality of batches including a first batch, comprising an onboarding, an offboarding, or a key rotation;
    in response to the comment migration instruction, retrieving from cloud storage across the firewall, a value of a migration status of a previous migration instruction and a value of a batch timestamp for the first batch operated on by the previous migration instruction;
    determining that the value of the migration status is started, and that the batch timestamp is within a predetermined time;
    precluding execution of the comment migration instruction in response to the determination that the value of the migration status is started and the batch timestamp is within the predetermined time; and
    otherwise, initiating the comment migration instruction to perform a comment migration,
    wherein the comment migration is controlled by the first browser, and wherein during the comment migration, the first browser retrieves encrypted comments from the cloud storage through a commenting service outside the firewall, sends the encrypted comments to a crypto server behind the firewall to decrypt and re-encrypt the encrypted comments using a different encryption, receives re-encrypted comments from the crypto server, and stores the re-encrypted comments in the cloud storage through the comment service.

12. A non-transitory computer readable storage medium as in claim 11 wherein the value of the migration status and the value of the batch timestamp are saved to the storage in response to the previous comment migration instruction.

13. A non-transitory computer readable storage medium as in claim 12 wherein the value of the batch timestamp is stored based upon successful processing of a batch of comments in the plurality of batches across the firewall.

14. A non-transitory computer readable storage medium as in claim 13 wherein:
    the previous comment migration instruction comprises onboarding or offboarding, wherein offboarding further comprises:
    forwarding, to the crypto server, the batch of comments;
    decrypting, by the crypto server, the batch of comments; and
    retrieving, from the crypto server, the batch of comments in decrypted form,
    the batch of comments comprises unencrypted comments.

15. A non-transitory computer readable storage medium as in claim 13 wherein:

the previous comment migration instruction comprises onboarding, offboarding, or key rotation, wherein key rotation comprises decrypting the plurality of comments before encrypting the plurality of comments such that the plurality of comments do not cross the firewall in decrypted form; and the batch of comments comprises encrypted comments encrypted by a crypto server located behind the firewall.

16. A computer system comprising:

one or more processors; and a software program, executable on said computer system, the software program configured to cause a migration engine located at a browser behind a firewall to:

store a value of a migration status and a value of a batch timestamp in response to receiving a previous comment migration instruction;

receive, in the browser behind the firewall, a comment migration instruction to modify an encryption form of a plurality of comments as a plurality of batches including a first batch;

in response to the comment migration instruction, retrieve from storage across the firewall, the value of the migration status of the previous migration instruction and the value of a batch timestamp for the first batch operated on by the previous migration instruction;

determine that the value of the migration status is started, and that the batch timestamp is within a predetermined time;

preclude execution of the comment migration instruction in response to the determination that the value of the migration status is started and the batch timestamp is within the predetermined time; and otherwise, initiating the comment migration instruction to perform a comment migration, wherein the comment migration is controlled by the first browser, and wherein during the comment migration, the first browser retrieves encrypted comments from the cloud storage through a commenting service outside the firewall, sends the encrypted comments to a crypto server behind the firewall to decrypt and re-encrypt the encrypted comments using a different encryption, receives re-encrypted comments from the crypto server, and stores the re-encrypted comments in the cloud storage through the comment service.

17. A computer system as in claim 16 wherein the software program is further configured to cause the browser to store the value of the batch timestamp based upon successful processing of a batch of comments in the plurality of batches across the firewall.

18. A computer system as in claim 16 wherein the batch of comments are encrypted by a crypto server located behind the firewall.

19. A computer system as in claim 16 wherein the batch of comments are decrypted by a crypto server located behind the firewall.

20. A computer system as in claim 16 wherein the previous comment migration instruction comprises onboarding, offboarding, or key rotation, wherein offboarding further comprises:

forwarding, to the crypto server, the batch of comments;

decrypting by the crypto server, the batch of comments;

retrieving, from the crypto server, the batch of comments in decrypted form; and key rotation comprises decrypting the plurality of comments before encrypting the plurality of comments such that the plurality of comments do not cross the firewall in decrypted form.

\* \* \* \* \*